C. L. BOUHAN.
NUT LOCK.
APPLICATION FILED JULY 13, 1911.
1,016,542.
Patented Feb. 6, 1912.
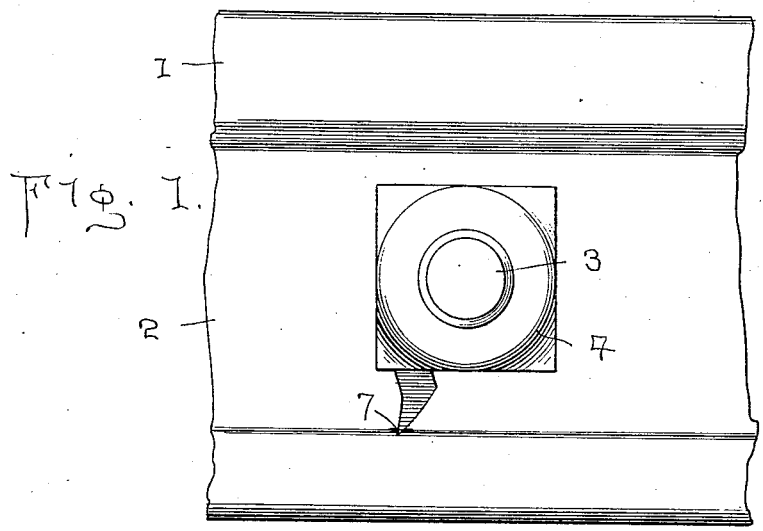
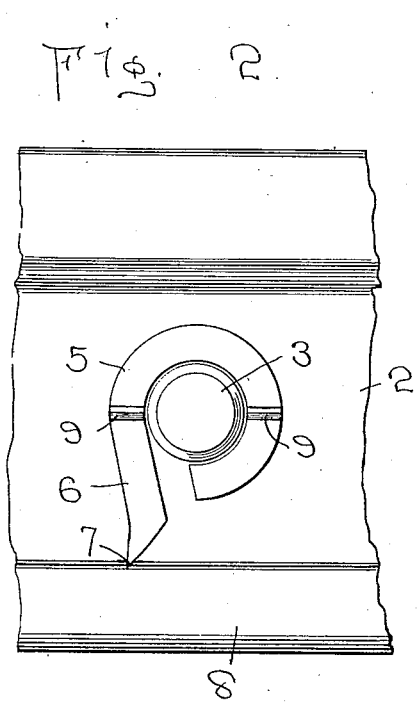
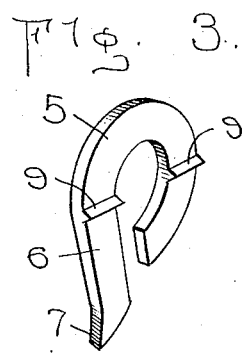
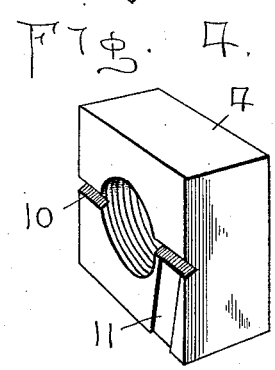
WITNESSES:
Thos. W. Riley
M. Newcomb
INVENTOR
C. L. Bouhan
BY
W. J. FitzGerald & Co.
Attorneys
COLUMBIA PLANOGRAPH CO., WASHINGTON, D. C.

UNITED STATES PATENT OFFICE.

CORNELIUS L. BOUHAN, OF CAMERON, MISSOURI.

NUT-LOCK.

1,016,542.   Specification of Letters Patent.   Patented Feb. 6, 1912.

Application filed July 13, 1911. Serial No. 638,318.

*To all whom it may concern:*

Be it known that I, CORNELIUS L. BOUHAN, a citizen of the United States, residing at Cameron, in the county of Clinton and State of Missouri, have invented certain new and useful Improvements in Nut-Locks; and I do hereby declare the following to be a full, clear, and exact description of the invention, such as will enable others skilled in the art to which it appertains to make and use the same.

My invention relates to new and useful improvements in nut locks and more particularly to that class adapted to be used in securing fish plates to track rails and my object is to provide in connection with a bolt and nut for the bolt, a split washer having projections thereon which engage recesses in the nut when the nut is turned onto the bolt.

A further object is to provide an extension at one end of the split of the washer, which extends into engagement with the base of the fish plate and serves to hold the nut against rotation under ordinary conditions.

A further object is to so taper the end of the extension as to produce a prong, which, when the nut is in locked position engages the surface at the base of the fish plate, and, a further object is to provide a recess in the inner face of the nut to receive the extension when properly engaged with the nut.

Other objects and advantages will be hereinafter pointed out in the specification.

In the accompanying drawings, which are made a part of this application, Figure 1 is an elevation of a portion of a track rail and fish plate, showing my improved device applied to use. Fig. 2 is a similar view with the nut removed. Fig. 3 is a perspective view of the locking washer, and, Fig. 4 is a perspective view of the nut used in combination therewith.

Referring to the drawings in which similar reference numerals designate corresponding parts throughout the several views, 1 indicates the track rail, which may be constructed in the usual or any preferred manner, and 2 indicates the fish plate used in connection therewith, the fish plate and track rail being secured together by means of a bolt 3 and a nut 4 coöperating therewith.

In order to hold the nut against reverse rotation when the nut is turned onto the bolt, I provide a split washer 5, one of the split ends having an extension 6 thereon which extends at a tangent to the axial center of the bolt. The free end of the extension 6 is cut at an angle to provide a prong 7, which prong is in position to contact with the base 8 of the fish plate.

Extending outwardly from the outer face of the washer 5 are substantially V-shaped projections 9, which are adapted to engage similarly constructed slots 10 in the inner face of the nut 4, so that the washer will be caused to rotate with the nut when the projections are seated in the slots, and although the prong moves into engagement with the base of the fish plate at each revolution of the washer the extension is positioned a sufficient distance from the opposite split end of the washer as to permit said extension to yield to permit the prong to drag over the face of the fish plate.

As the inner face of the nut fits against the outer face of the washer and would consequently grip the extension to such an extent as to prevent the extension from yielding to permit the prong to pass over the face of the fish plate a recess 11 is formed in the inner face of the nut and is so positioned as to register with the extension. When the nut is turned sufficiently onto the bolt as to engage the projections 9 with the slots 10, the continued rotation of the nut will cause the washer to rotate therewith and the extension on the washer will yield sufficiently to drag over the face of the fish plate as the nut is being turned to properly tighten the same on the bolt. When the nut is sufficiently tightened the prong end of the extension will be in engagement with the base of the fish plate so that any attempt to turn the nut in a reverse rotation will result in causing the prong to bite into that portion of the fish plate with which it engages. It will thus be seen that it will require a great deal of force to loosen the nut as it will be necessary to overcome the frictional and biting engagement of the prong with the fish plate in order to release the nut. It will further be seen that this device can be very cheaply constructed and will be positive in its operation.

What I claim is:

1. In a nut lock the combination with a bolt, and a nut coöperating therewith, of a split washer having means to engage the nut and rotate therewith, one of the split ends of the washer having an extension adapted to engage and bear against a portion of a contiguous fish plate at each revolution of the washer.

2. In a nut lock the combination with a bolt, and a nut coöperating therewith, of a split washer, one of the split ends terminating in an extension, said extension being positioned a distance from the other split end of the washer to permit resilient movement of the extension and means on the washer adapted to engage the nut and cause the washer to rotate with the nut, the free end of said extension having a prong adapted to drag over and engage parts of a contiguous fish plate when the washer is rotated.

3. In a nut lock the combination with a bolt, and a nut coöperating therewith, said nut having slots and a recess in its inner face, of a split washer having projections adapted to engage the slots in the nut, one split end of the washer having an extension spaced a distance from the other split end, the lower end of said extension being tapered to form a prong, said prong being adapted to drag over and engage a contiguous fish plate as the washer and nut are rotated, said extension alining with the recess in the nut.

4. In a nut lock the combination with a bolt and a nut coöperating with the bolt, said nut having slots and a recess in its inner face, of a split washer having projections thereon adapted to engage said slots, one of said split ends having an extension adapted to register with the recess in the nut, the free end of the extension having a prong adapted to engage parts of a contiguous fish plate and drag thereover when the washer is rotated.

In testimony whereof I have signed my name to this specification in the presence of two subscribing witnesses.

CORNELIUS L. BOUHAN.

Witnesses:
  JOHN C. CARR,
  JOHN W. TALBOT.

---

Copies of this patent may be obtained for five cents each, by addressing the "Commissioner of Patents Washington, D. C."